United States Patent [19]
Goude et al.

[11] Patent Number: 4,689,616
[45] Date of Patent: Aug. 25, 1987

[54] METHOD OF PRODUCING AND MODIFYING A SYNTHETIC PICTURE

[75] Inventors: Marie Goude, Logne; Jean-Claude Six, Versailles, both of France

[73] Assignee: U.S. Philips Corporation, New York, N.Y.

[21] Appl. No.: 759,765

[22] Filed: Jul. 29, 1985

[30] Foreign Application Priority Data

Aug. 10, 1984 [FR] France ................................ 84 12672

[51] Int. Cl.$^4$ .............................................. G09G 1/06
[52] U.S. Cl. .................................... 340/725; 340/724; 340/729; 340/744; 340/791; 340/798
[58] Field of Search ............... 340/724, 725, 726, 729, 340/744, 747, 791, 792, 798, 799; 273/856, 313, DIG. 28; 364/522

[56] References Cited

U.S. PATENT DOCUMENTS

| | | | |
|---|---|---|---|
| 4,324,401 | 4/1982 | Stubben et al. | 340/725 |
| 4,471,464 | 9/1984 | Mayer et al. | 340/725 |
| 4,484,187 | 11/1984 | Brown et al. | 340/724 |
| 4,554,538 | 11/1985 | Bieneman | 340/799 |

*Primary Examiner*—Gerald L. Brigance
*Assistant Examiner*—Jeffery A. Brier
*Attorney, Agent, or Firm*—Jack E. Haken; James J. Cannon, Jr.

[57] ABSTRACT

The invention relates to a method of producing and modifying the contents of a picture memory ("mapped memory") by means of objects to be represented described in an object memory. When an object is arranged in the picture, the picture elements that were contained in the perimeter of the object before the latter was positioned were protected in the object memory (5) at the address of the description of the object and taking its place. For displacing an object, it is consequently sufficient to exchange the picture elements between the object memory and the picture to recreate the picture with the object and then to re-arrange the object in another position according to the same exchanging process.

8 Claims, 3 Drawing Figures

METHOD OF PRODUCING AND MODIFYING A SYNTHETIC PICTURE

BACKGROUND OF THE INVENTION

1. Field of the Invention

The invention relates to a method of producing and modifying the contents of a picture memory in an apparatus for displaying synthetic pictures subdivided into elementary points or pixels whose color and/or luminance are defined by digital codes in said picture memory, in which a given position is assigned to each pixel, the picture comprising objects which can cover at least in part other objects, thus providing the visual effect of being arranged in front of the latter objects, the apparatus furthermore comprising an object memory or a magazine which contains the description, pixel per pixel, of a plurality of objects, among which those are selected which are needed to construct the picture in the picture memory, as well as a register in which data are stored which especially indicate the position of the objects in the picture.

2. Description of the Prior Art

Such a method is used in video games or in microcomputer display systems. The display is effected in general in these systems by means of a movable point describing a succession of lines sequentially scanned in response to horizontal and vertical synchronization signals. Methods are known of producing the picture, in which the coordinates X and Y of each object are compared with the contents of counters following the position of the point along the lines of the picture. The objects are introduced into the image "at random" during the displacement of the point when the latter passes the coordinates X, Y of the object. Such a method is described, for example, in British Patent GB-2,000,946 A. This method is not very suitable for pictures comprising a large number of objects because a quantity of calculations has to be carried out.

Another known method uses a picture memory which is filled beforehand with the elements of the picture and which is read in synchronization with the operation of scanning the lines of the picture. Methods of this type are described, for example, in U.S. Pat. No. 4,116,444, in which the picture memory contains only one line and has to be updated again at each line, or in U.S. Pat. No. 4,165,072, in which the memory contains a complete picture. In this case, the number of objects is not limited, but the method requires a high storage capacity.

The invention relates to a method of this type, in which a memory of a complete picture is used and in which a solution is provided for the problem involved in the control of the operation in which the pictures cover each other. It is known to handle this problem by defining several planes each containing one or several objects, in which event the objects of a so-called "front" plane have to cover the objects of a so-called "rear" plane. During the display of the picture, a choice is made between the planes in dependence upon the priority rules based on the front or rear position of the planes. Such a method is described, for example, in French Pat. No. 2,535,871.

This solution leads to the use of several memories of a complete picture and the storage capacity is extremely high.

SUMMARY OF THE INVENTION

The invention has for its object to provide a method, by means of which, while using a memory of a single picture, the operation in which the objects cover each other can be controlled in a very simple manner: instead of using several planes, each of which is represented by a distinct picture memory, the invention is based on the idea of filling, whilst using a memory of a single picture, first the whole picture with the objects which are located in the rear plane, after which the object of each successive plane are introduced from the rear, thus terminating by the object in the foremost position, and of saving for each object introduced the picture elements which are situated inside the contour of the object before the introduction of the latter, which permits, when this object has then to be removed, of immediately retrieving the picture element to be returned to its place, while moreover, in order to economize space in the memory, the space used for the description of the object in the object memory is utilized to store therein for the time being said saved picture elements. The description of the object is not lost, however, because this object is located in the picture memory. The latter is thus utilized not only as a picture description for the display, but at the same time as provisional element for storing objects.

The method according to the invention is therefore characterized in that, the picture memory being filled completely beforehand by a picture constituting a rear plane, in order to place the objects in the picture, the position of each object to be represented is read one by one in the register in the order in which the objects have to cover each other starting from the rear plane, and each time the digital codes of the picture memory for said position are exchanged for those of the object memory, and in that, in order to displace an object, not covered by another object, the said exchange is effected two times in succession for the relevant object while modifying between these two operations the position of this object.

When the object to be displaced is covered by at least one other object, it is advantageous to take special precautions to displace it, and the method according to the invention permits of carrying out this displacement in a very simple manner by first carrying out for all the objects concerned a group of exchanges between the picture memory and the object memory, which are identical to those effected for placing the objects in the picture, but by processing the objects in the inverse order, and by finally moving the objects concerned to their new positions in the order in which they have to be covered by each other by means of a new group of exchanges.

In order to carry out readily the operations just described, it is interesting that the data of positions of successive objects are stored in the register in the order in which these objects have to cover each other.

BRIEF DESCRIPTION OF THE INVENTION

In order that the invention may be readily carried out, it will now be described more fully, by way of example, with reference to the accompanying drawings in which:

FIG. 1 shows diagrammatically the organization of a system for carrying out the method according to the invention, FIG. 2 shows, taking a rear plane and two objects as example, the treatment realized by this method, FIG. 3 shows diagrammatically the organization of the automatic control means 6 of FIG. 1.

DESCRIPTION OF THE PREFERRED EMBODIMENT

Figure 1:
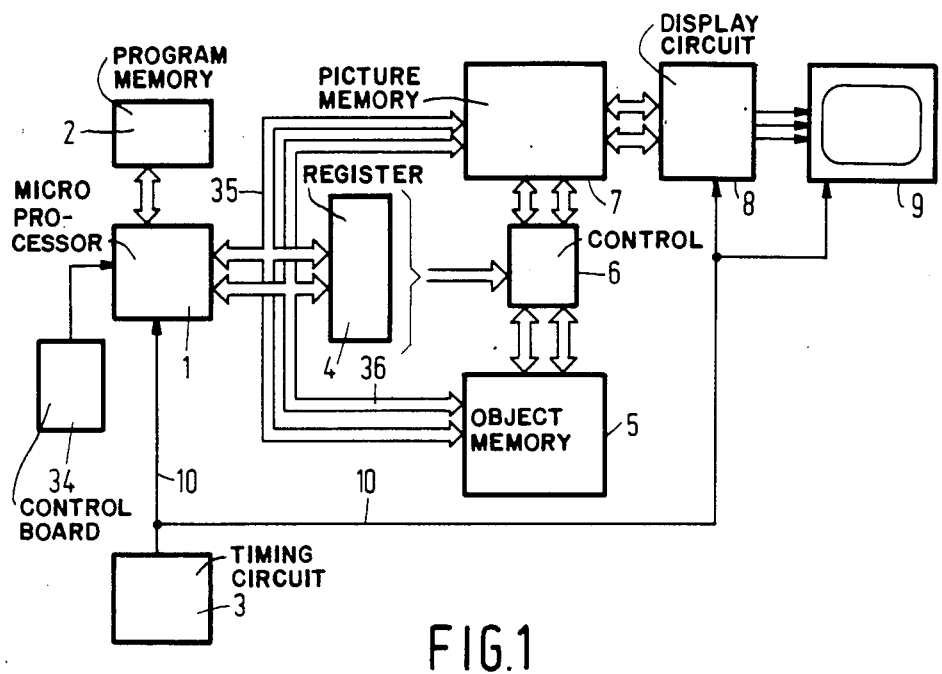

The system of FIG. 1 comprises a microprocessor 1 associated with a control board 34 that may be provided with a control lever of the "scanning sleeve" type for controlling the displacement of objects and with a program memory 2 containing instructions for the system. It moreover comprises a circuit 8 for displaying the picture, which circuit extracts from a picture memory 7 the data relating to the pixels to be displayed in synchronization with the description of the picture and supplies them to a suitable display device 9, for example a color cathode-ray tube, with its systems of controlling the luminance, color and deviation. Such a circuit is known and can be readily realized by those skilled in the art. A timing circuit 3 supplies line and field synchronization signals to the circuits 8 and 9 and to the microprocessor. Moreover, a register 4 for recording data indicating the positions of the objects in the synthetic picture memory 7 is updated by the microprocessor 1 and is read by automatic control means 6 which transfer data to the picture memory 7 from an object memory 5 designated as magazine, which contains the description, object per object and pixel per pixel, of a plurality of objects susceptible of being inserted in the picture, i.e. in the picture memory.

Moreover, these automatic control means can also produce an exchange of data between the picture memory 7 and the magazine 5. The microprocessor has direct access to the contents of the object memory 5 and of the picture memory 7 through data and address buses 35, 36.

The picture is subdivided into elementary points or pixels and comprises, for example, 280 lines of each 512 points, i.e. 143,360 pixels in all. The color of each of these pixels is defined, for example, in a palette of 16 colors by means of 4 bits per pixel (in a black-and-white picture, these 4 bits could define a grey scale). The picture memory consequently has a capacity of 4 bits × 143,360 pixels = 573,440 bits.

The picture memory is organized per block of 16 bits arranged in rows and columns. A dynamic memory is used, which has to be refreshed at regular intervals. Each block of 4 bits corresponds to a point of the picture and can be read by row/column addressing as a function of the coordinates X,Y of the point in the picture. In practice, these blocks are written and read per group of 4, i.e. 16 bits at a time, in order to accelerate the process, which does not lead to any change of the basic principle according to which a given position is assigned in the memory to each pixel.

In order to produce a picture, first the picture memory is completely filled by codes defining all the pixels of a rear plane. These codes could be present in the magazines, but more advantageously they are extracted from a memory of high capacity, for example a magnetic disk, and loaded directly into the picture memory by the microprocessor through the buses 35 and 36. For inserting the movable objects, the positions in the picture of the objects to be represented are read one by one in the register 4 in the order in which the objects have to cover each other, i.e. from the hindmost object, terminating by the object situated in the first plane.

In contrast with the known methods, in which a limited number of picture planes equal to the number of picture memories is used, in this case the number of planes and the number of objects are equal, each object being situated before or behind another object.

Advantageously, the data of positions of successive objects are stored in the register in the order in which these objects have to cover each other. This constitutes the simplest means for defining the order in which they have to be arranged. It is then sufficient to read the register in series.

Besides the position of each object defined by its coordinates X, Y in the picture, i.e. in practice by its address in the picture memory 7, said register also contains: the place of the object in the magazine defined by its offset with respect to a starting address, the dimensions of the object: height and width, and some operation codes, which will be explained hereinafter. Each object is defined in a rectangular window. Since the objects are not always rectangular, it is of course obvious to use the term "transparency". One of the 16 colors is utilized to indicate the transparency. During the processing of the objects, a pixel of transparent color is consequently considered as significant: "no object at this point". The use of rectangular windows facilitates the calibration of the coordinates, each line of an object always beginning at the same abscissa.

Each time an object is placed in the picture memory, for each pixel of the object the digital codes of the picture memory are exchanged for those of the magazine. This operation is effected, for example, per block of 8 pixels, i.e. 32 bits. Let it be assumed, for example, that the 8 pixels of the object in the magazine are the following:

$$\backslash T \ \backslash T \ \backslash T \ \backslash M \ \backslash M \ \backslash M \ \backslash M \ \backslash M \ \backslash$$

where T = "transparent" and M = "maroon" and that the picture memory contains a stock of grey G and blue B, the pixels of this memory being the following:

$$\backslash G \ \backslash G \ \backslash G \ \backslash G \ \backslash G \ \backslash G \ \backslash B \ \backslash B \ \backslash$$

For the three first pixels T of the object, nothing is modified in the memory. When the real object, i.e. a color other than T, is met, the pixels "picture" are exchanged for the pixels "magazine".

Consequently, after this operation, the following eight pixels are present in the magazine and in the picture, respectively:

Magazine: $\backslash T \ \backslash T \ \backslash T \ \backslash G \ \backslash G \ \backslash G \ \backslash B \ \backslash B \ \backslash$ Picture: $\backslash G \ \backslash G \ \backslash G \ \backslash M \ \backslash M \ \backslash M \ \backslash M \ \backslash M \ \backslash$ Otherwise, the procedure can be carried out according to various modifications, for example, reversing only the codes T (instead of ignoring them) and then reversing the whole of the eight pixels; this leads to the same result.

Figure 2:
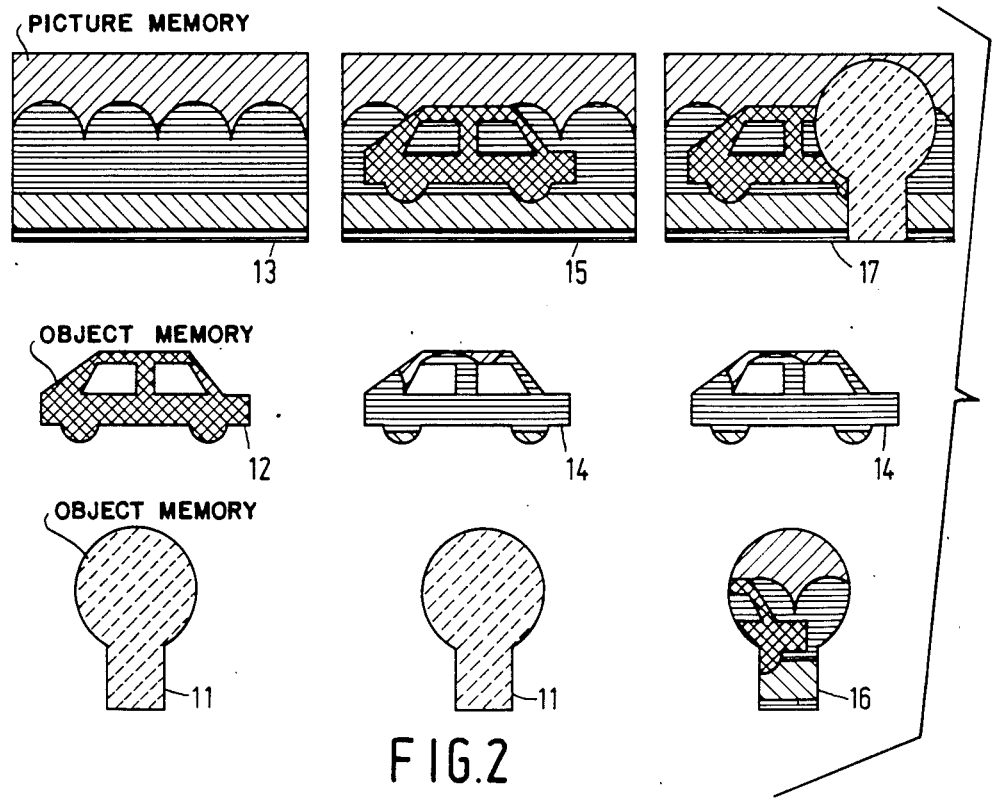

This process is illustrated in FIG. 2. For example, initially there is a stock 13 in the picture memory and an automobile 12 is located in the magazine. After an exchange as described above, the automobile is present in the picture 15 and the landscape elements situated inside the contours of the real (non-transparent) object are present in the form of the object 14 in the magazine.

In order to displace an object not covered by another object, for example the automobile of the picture 15, first an exchange of pixels is effected for a first time, which leads in the case of the above example to the following block of pixels, which correspond to a return of the previous state:

Magazine: \T \T \T \M \M \M \M \M \

Picture: \G \G \G \G \G \G \B \B \

The indication of position as to this object in the register 4 is then modified. Let it be assumed, for example, that this object is offset by two points to the right. The eight pixels of the stock corresponding to those of the above object then become:

Picture: \G \G \G \G \B \B \B \B \

A second exchange of the points of the real image is then effected, which leads to the following eight pixels:

Magazine: \T \T \T \G \B \B \B \B \

Picture: \G \G \G \M \M \M \M \M \

This object, for example the automobile of FIG. 2, can be covered by another object: During the creation of the picture, leading to picture 15 and having object 14 stored then in the magazine, a new exchange for a following object is effected in the order in which the objects have to cover each other, starting from the rear plane; in the example of FIG. 2, the following object is a tree 11, which has to cover a part of the automobile in order to produce the picture 17.

The exchange takes place between the object 11 and the picture 15 in order to produce the picture 16 in the magazine and the picture 17 in memory 8. The object 14 in the magazine is not changed.

After an object has been arranged in the picture, its description is modified in the register 4 and is consequently no longer available therein in the initial form. Thus, it is necessary, if several identical objects are used in the picture, that each of these objects is described in a distinct manner in the magazine 5. If, for example, there are two identical automobiles of the model designated by 12, the microprocessor 1 has to arrange, before any manipulation by the automatic control means, two identical descriptions of this automobile at two distinct addresses in the magazine 5. When the register 4 will be read in the order of the objects from the rear plane to the first plane, consequently a first address will be met in 5 for the automobile arranged in the hindmost position and then a second address is met for the automobile arranged in the foremost position.

In order to displace an object covered by one or several other objects, first a group of exchanges for all the objects concerned is effected between the picture memory and the magazine identical to those effected for arranging the objects in the picture, but by processing the objects in the inverse order; then the indications of positions as to these objects in the register are modified, after which finally the objects concerned are rearranged in the picture in the order in which they have to cover each other by means of a new group of exchanges.

For example, in the case shown in FIG. 2, first the exchange 16-17 is effected, which yields 11-15, after which the exchange 14-15 is effected, which yields 12-13. Consequently, the tree and then the automobile are processed, that is to say that the objects are processed in the order inverse to that used for arranging the objects in the picture. Thereafter, for example, the coordinate X of the vehicle is modified so as to advance it, whereupon the picture is reconstructed by the successive exchanges 12-13 (which yields 14-15) and 11-15 (which yields 16-17), this time in the order: first the automobile, then the tree. In practice, this means that, in order to arrange a group of objects in the picture, the register 4 is read in one sense, and in order to remove the same group of objects, the same register is read in the other sense. AMore precisely, if, for arranging a part of the objects, a part of the register is read, the same part of the register is read in the other sense for removing the same objects.

When an object should be moved, it is therefore necessary to know if this object is or is not covered, at least in part, by another object.

Two techniques can be combined for answering that question. One of these techniques consists in removing and rearranging all objects as soon as at least one object is displaced; this technique is improved by recognizing the fact that, the objects being arranged in the order of the planes, if one starts from the first plane to rearrange the initial objects in the magazine as soon as the object to be displaced has been processed that is in the hindmost position, it is no use proceeding further. If preferably the objects interrogated are arranged so as to be frequently displaced in the first planes, the amount of operations is reduced.

The other technique consists in calculating the interferences between each object to be displaced and all of the other objects situated before the object to be displaced as a function of the coordinates and dimensions in order to know if they cover or do not cover each other before as well as after the displacement. If the real form of the objects is the basis, this calculation is very long; if only the rectangular windows enclosing each object and being defined in the register 4 are the basis, the calculations are considerably simplified: this calculation can indicate that an object covers the object to be displaced while this is not at all the case if actually the covering part is transparent, but if on the contrary the calculation indicates that the rectangles do not cover each other, it is no use processing the immovable object although it lies in a front plane. Several degrees in the combination of these two techniques are imaginable. One method consists, for example, in calculating, as indicated above, the interferences by storing all the objects having a rectangular part common to at least one of the objects to be displaced and then reading the register 4 in the desired order (i.e. first from the first plane to the rear plane and then in the other sense after modification of given coordinates of objects), while the exchange of pixels is effected only if the objects met in the register form part of the list indicated above (instead of giving a list, flags may alternatively be placed at each object of the register 4).

If planes should be inverted, i.e. if given objects should be caused to pass from the rear plane to the front, it suffices to process the objects in a different order when the objects are rearranged in the picture, that is to say that it suffices to change the order of the objects in the register 4 between the two groups of exchanges.

Furthermore, objects can be suppressed or added in the register 4, which results in that these objects will disappear or appear during the next group of exchanges. However, an object can be added or suppressed in a group of objects of the register only after the first group of exchanges is effected to rearrange the objects. and the picture in the state in which only the stock and the immovable rear plane objects are left, for example the state represented by 11, 12, 13 in FIG. 2.

The automatic control means 6 are mainly constituted by components, such as counters, registers and logic networks which are cabled and permit of effecting the necessary transfers much more rapidly than could be the case with a software device. They have multiple functions. They are provided with means for exchanging data between the magazine and the picture memory 7 according to the process explained above. They are further provided with means for transferring data from the magazine to the picture without an exchange: this permits, for example, of introducing objects into the stock in order to ultimately modify the latter. They are also provided with means for transferring data from the picture to the magazine without an exchange: this permits of producing new objects in the magazine starting from elements of the picture at a given instant. They can also change the colors of the objects during a transfer to the picture. The operations they have to carry out are indicated by operation codes associated with the object in the register 4. The codes moreover indicate a word in a state for exchanging data between the microprocessor and the automatic control means. The register 4 can moreover indicate in a single operation during the displacement of objects the old and the new position of the object and the automatic control means then realize solely the groups of exchanges in one sense and then in the other sense. The automatic control means 6 can displace rapidly a pixel or a group of pixels from a source memory position to a destination memory position with manipulation of the contents of the pixel(s), as explained above. They can be programmed by a list of commands written into a memory of the system or directly by a microprocessor.

These automatic control means are capable of carrying out recurrent manipulations in the case in which the elements to be processed are situated at successive memory addresses while taking into account offsetts that have become necessary by the organization per block of 4 pixels.

Figure 3:
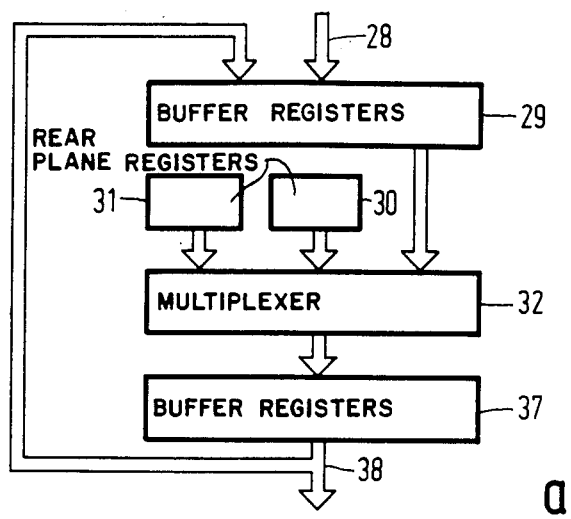
Figure 3:
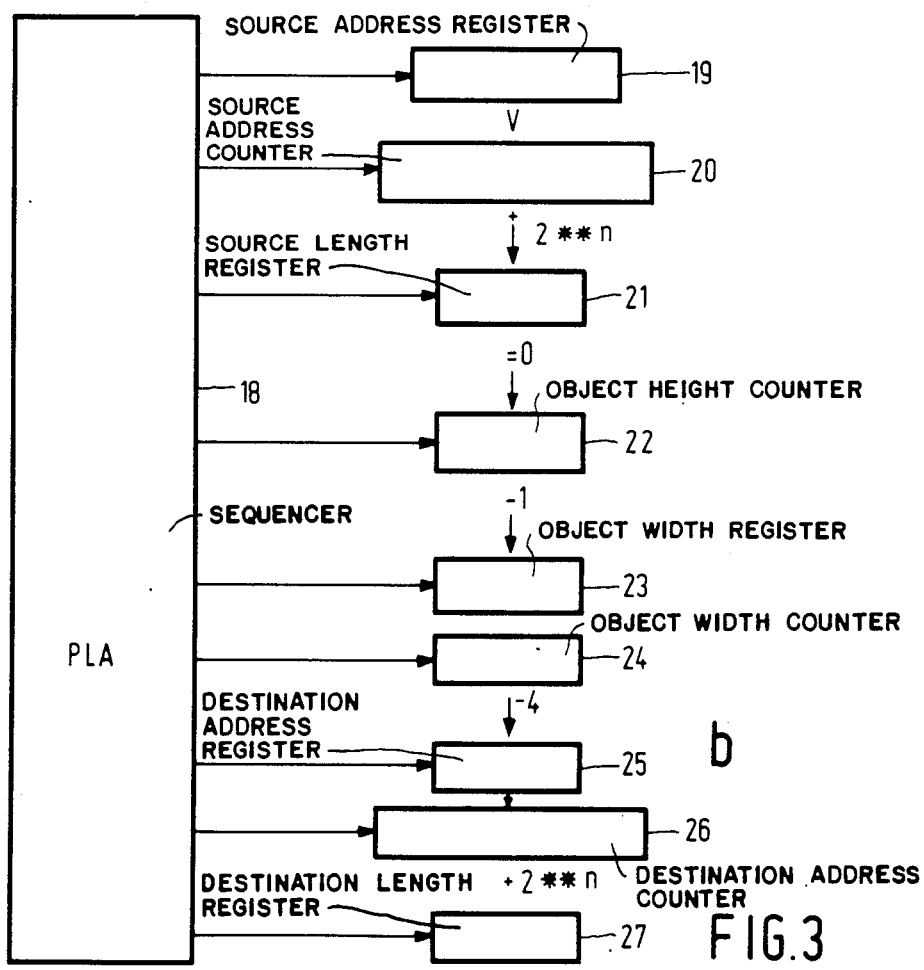

The automatic control means shown diagrammatically in FIG. 3 are constituted by two parts a and b, i.e. one (b) for processing the addresses and the other (a) for processing the data.

The part for processing the data (a) is organized per block of four pixels. It comprises mainly a multiplexer 32, two buffer registers 29,37, a rear-plane register and a front-plane register 30, 31.

The multiplexer 32 is capable of loading into one of the buffer registers 37 data originating from the other buffer register 29 or from one of both front- and/or rear-plane registers 30, 31. The loads are provided in different ways according to the operation required by the operation code and the contents of the pixels themselves. For example, in order to obtain an exchange as described above, the bits are transferred from one register to the other only after a test carried out by cabled logic, i.e. each time for 4 bits, that is to say one pixel at a time, which test serves to verify whether the pixel is transparent or non-transparent.

The bus 38 permits of loading the contents of the register 37 into the destination memory 7 or 5 and the bus 28 permits of loading the buffer register 29 from the source memories 5 or 7.

The part for processing the addresses (b) provides the addresses of the words in the source memory 5 or 7 and in the destination memory 7 or 5. The memories 7 and 5 are alternately source and destination memories because data are exchanged between them. The addresses are updated by the automatic control means in the case of recurring processing. The initial values of the addresses and the operation codes are obtained from the register 4.

This part is consequently constituted by counters whose incrementation and load pulses are produced by a sequencer 18 comprising a programmable logic network (PLA, English abbreviation) as a function of the desired operation.

The automatic control means are provided not only with the register for storing the operation code, but also with the following registers and counters:
source address register 19
source address counter 20
source length register 21 indicating the number of pixels to be read,
object height counter 22
object width register 23
object width counter 24
destination address register 25
destination address counter 26
destination length register 27 indicating the number of pixels to be written.

At the beginning of each line, the contents of the register 23 are transferred to the register 24.

After the first movement, the address registers are incremented by four units and the counter 24 is decremented by four units. When the counter 24 arrives at zero, the line is terminated. The contents of the register 25 are then transferred to the lower part of the counter 26 in such a manner that the address of the beginning of the line is restored therein. This counter is incremented by 2**n by a pulse, thus providing the address of the beginning of the next line. The counter 22 is then decremented by one unit and is tested. If it contains zero, the transfer is terminated. If this is not the case, the same manipulation is carried out on the registers 19, 20 and 21 in order to calculate the new source address.

The lower part of the counters 20 and 26 can be considered as representing the source and destination coordinates X respectively, and the upper part can be considered as representing the source and destination coordinates Y respectively.

The initial load of the automatic control means consists in reading into the register 4 and in introducing into the registers and counters ad hoc of the automatic control means the following data:
operation code
source address transferred to the counter 20 and the register 19
source length in the register 21
object height in the counter 22 object width in the register 23
destination address in the register 25 and the counter 26
destination length in the register 27

Such automatic control means thus defined can be readily realized by those skilled in the art.

A numerical example permits of defining more accurately an embodiment of the method. The picture memory has a capacity of 35 words of 16 bits. This memory is consequently accessed by 16 bits at a time, i.e. by four pixels at a time. The magazine has, for example, a capacity of 32K words of 16 bits. The register has a reduced capacity and can be physically placed in a part of the magazine or in a suitable memory of the microprocessor.

The picture comprises 280 lines of 512 pixels each. In this case, two thirds of a line period are assigned to the picture and the remaining third is assigned to the line fly-back. Furthermore, in a so-called 624 line picture which is non-interlaced, i.e. of 312 lines per field, 280 picture lines and 32 fly-back field lines are present. In the case iof a so-called 525 lines standard, the number of picture lines has to be reduced in order to maintain a sufficient field fly-back time.

The conventional line period in the television system being 64 $\mu$sec and 512 pixels being represented during two thirds of this period, the duration of a pixel is 83.3 nS.

The assembly of the memories is distributed between the picture control system and the microprocessor, in such a manner that a common refreshing device is sufficient. In these conditions, preferably two memory accesses are assigned to the display or the processing of the picture for one access assigned to the microprocessor. Consequently, the accesses are grouped in numbers of three. As a function of the speed of the dynamic memories currently available, three memory accesses require about 650 nS, which corresponds to the duration of displaying nearly 8 pixels. Consequently, the pixels are processed per group of 8 and the base time for three accesses will consequently be 666 nS.. Among these three accesses, two correspond to the display, and because the memory is accessed by 4 pixels at a time, these two accesses accurately correspond to a group of 8 pixels.

In order to carry out an exchange, the following procedure is required:
once the picture memory has to be accessed to read into it,
once the magazine has to be accessed to read into it,
once the picture memory has to be accessed to write into it,
once the magazine has to be accessed to write into it, which requires four accesses. Each access relating to four pixels, the operation thus requires on an average one access per pixel.

Of course, during the display time, two of three accesses are assigned to the display system 8, while during the line or field fly-back they are assigned to the processing of the picture.

A field fly-back lasts 32 lines$\times$64 $\mu$S=2048 $\mu$S. In this period, about 128 $\mu$S is required for refreshing the memories; 1920 $\mu$S of useful time remains for modifying the picture, which permits 2880 base times each comprising two accesses to the picture; consequently, 5760 accesses are available during a field fly-back. Let it be assumed, for example, that in a video game football players and a football are displayed, the football being defined in a rectangle of 12$\times$8 pixels, i.e. 96 pixels and each player being defined in a rectangle of 20$\times$26 pixels, i.e. 520 pixels. A displacement requires two successive exchanges with modification of the position of the object between the two exchanges, while each exchange, as explained above, requires one access per pixel. Consequently, a displacement requires two accesses per pixel.

In order to displace the football, there are required: 96$\times$2=192 accesses. Thus, there remain: 5760−192=5568 accesses available during field fly-back for displacing the players. This consequently permits of displacing five players (with 1040 accesses per player) on the assumption that they are in the first plane and that consequently no other object is involved in the displacement.

The line fly-backs may also be used to carry out a picture processing, which improves the performances.

Of course, the application of the invention is not limited to the embodiment described and variations are imaginable without departing from the scope of the invention. For example, more rapid memories may be used; in this case, more than three accesses per base time may be available and thus the supplementary accesses may be used for processing pictures contained therein during the display times because only two accesses are required for the display. Further, the accesses may also be distributed, for example in that sequentially a number of accesses are formed for the display and by storing the relevant data in a buffer memory, which permits of then making free a number of accesses for processing the picture while extracting the data from the buffer memory for the display. It is also possible to use a different number of lines for the picture, which can permit especially of increasing the field fly-back time.

Otherwise, it is frequently necessary, for example, in a game in which the microprocessor has to know whether a projectile has reached its goal, to ascertain the collisions between objects. The method of displaying does not supply any information about these collisions. It is therefore necessary for the interesting objects (and for these objects only) to carry out calculations of collisions in known manner independently of the just-mentioned display.

Otherwise, it is interesting to provide an additional pseudo-picture memory which serves to prepare given picture elements in advance independently of the picture during the display. The method according to the invention is then advantageously used for producing and modifying picture elements in this additional memory.

The circuits permitting of carrying out the invention can be readily combined by those skilled in the art to form a single integrated circuit. With a microprocessor, such as the Signetics 68070, the aforementioned integrated circuit and memory chips, a minimum solution is provided for a home computer. The load of labor of the logic unit (of the microprocessor) is low due to the specific circuits with the automatic control means and the logic unit can have the time free for the software of the user. The system may also permit of obtaining a more sophisticated construction by adding mass memories, other dynamic memories and other functions.

What is claimed is:

1. A method of producing and modifying the contents of a picture memory in an apparatus for displaying synthetic pictures subdivided into elementary points or pixels, whose color and/or luminance are defined by digital codes in said picture memory, in which a given position is assigned to each pixel, the picture comprising objects which can cover at least in part other objects, thus providing the visual effect of being arranged in front of the latter objects, the apparatus further comprising an object memory which contains the description, pixel per pixel, of a plurality of objects, among which those objects are selected which are needed to construct the picture in the picture memory, and a register in which data are stored indicating the positions of the objects in the picture, characterized in that, said picture memory is filled beforehand completely by a picture constituting a rear plane for arranging the objects in the picture, the position of each object to be represented is read one by one in said register in the order in which the objects have to cover each other from the rear plane, while for each pixel of the object the digital codes of said picture memory are exchanged for those of said object memory, and in that, for displacing one or several objects, that may be covered by one or several other objects, first for each object involved an exchange of codes is effected between said picture memory and said object memory, but, if there are several objects overlapping each other, then the objects are exchanged in the order inverse to that used for arranging the objects in the picture, in that then the position of the object(s) in said register is modified and finally each object involved is rearranged in its new position in the picture by means of a new exchange by processing the objects, if there are several of them, in the order in which they have to cover each other.

2. A method as claimed in claim 1, characterized in that all the objects situated in the first plane inclusive of the object to be displaced in the hindmost position are considered to be involved.

3. A method as claimed in any one of claims 1 or 2, characterized in that, when the objects are rearranged in the picture, the order of processing the objects is different from the order used during the preceding positioning.

4. A method as claimed in any one of the claims 1 or 2, characterized in that, when the objects are rearranged in the picture, objects are removed or added.

5. A method as claimed in any one of claims 1 or 2, characterized in that the data of positions of successive objects are stored in the register in the order in which these objects have to cover each other.

6. A method as claimed in any one of claims 1 or 2, characterized in that the objects are all rectangular and comprise transparent zones, which are not taken into account in the aforementioned exchanges.

7. A method as claimed in any one of claims 1 or 2, characterized in that the data of the register indicating the position of each object are organized per block, each block corresponding to an object indicating the address of the object in the object memory, its dimensions and its operation codes.

8. A method as claimed in any one of claims 1 or 2, characterized in that new objects are formed in the object memory by recopying them therein from the picture memory.

* * * * *